US011983300B2

(12) United States Patent
Slavin et al.

(10) Patent No.: US 11,983,300 B2
(45) Date of Patent: May 14, 2024

(54) SYSTEM AND METHOD FOR IMPLEMENTING A MARKET DATA HUB

(71) Applicant: JPMorgan Chase Bank, N.A., New York, NY (US)

(72) Inventors: Ilya Slavin, Brooklyn, NY (US); Gordon J. Taylor, Easton, CT (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 733 days.

(21) Appl. No.: 17/045,839

(22) PCT Filed: Apr. 12, 2019

(86) PCT No.: PCT/US2019/027185
§ 371 (c)(1),
(2) Date: Oct. 7, 2020

(87) PCT Pub. No.: WO2019/200236
PCT Pub. Date: Oct. 17, 2019

(65) Prior Publication Data
US 2021/0141939 A1 May 13, 2021

Related U.S. Application Data

(60) Provisional application No. 62/656,585, filed on Apr. 12, 2018.

(51) Int. Cl.
*G06F 21/62* (2013.01)
*G06Q 30/0201* (2023.01)
(Continued)

(52) U.S. Cl.
CPC ..... *G06F 21/6272* (2013.01); *G06Q 30/0201* (2013.01); *G06Q 40/04* (2013.01);
(Continued)

(58) Field of Classification Search
None
See application file for complete search history.

(56) References Cited

U.S. PATENT DOCUMENTS

2003/0041000 A1* 2/2003 Zajac ..................... G06Q 40/04
705/37
2010/0034389 A1* 2/2010 Sakharov ............... H04L 63/10
713/168

(Continued)

OTHER PUBLICATIONS

PCT Notification of Transmittal of the International Search Report and Written Opinion, The International Searching Authority, International Application No. PCT/US19/27185, Jul. 17, 2019, pp. 1-8.

(Continued)

*Primary Examiner* — Brandon Hoffman
(74) *Attorney, Agent, or Firm* — GREENBLUM & BERNSTEIN, P.L.C.

(57) ABSTRACT

An embodiment of the present invention is directed to a market data hub. The innovative system comprises a processing engine that manages contributed content and allows for custom analytics, alerting, reporting, machine learning interfaces, etc., while preserving entitlements controls specific to participants. Moreover, the system disseminates market data to downstream consumers and syndicated entities that are entitled to view the market data.

20 Claims, 4 Drawing Sheets

(51) Int. Cl.
*G06Q 40/04* (2012.01)
*G06Q 40/06* (2012.01)
*H04L 9/06* (2006.01)
*H04L 9/00* (2022.01)

(52) U.S. Cl.
CPC .......... *G06Q 40/06* (2013.01); *H04L 9/0643* (2013.01); *H04L 9/50* (2022.05)

(56) References Cited

U.S. PATENT DOCUMENTS

| | | |
|---|---|---|
| 2010/0268605 A1 | 10/2010 | Waelbroeck et al. |
| 2015/0127516 A1 | 5/2015 | Studnitzer et al. |
| 2017/0134161 A1* | 5/2017 | Goeringer ............ G06Q 20/065 |

OTHER PUBLICATIONS

European Patent Office, Communication including the Extended European Search Report, European Patent Application No. 19785216.3, Nov. 22, 2021, pp. 1-8.
Communication pursuant to Article 94(3) EPC dated Jul. 24, 2023 issued in European patent application No. 19785216.3-1218.

* cited by examiner

SYSTEM AND METHOD FOR IMPLEMENTING A MARKET DATA HUB

CROSS REFERENCE TO RELATED APPLICATIONS

This application is a U.S. National Phase Application under 35 U.S.C. § 371 of International Application No. PCT/US2019/027185, filed Apr. 12, 2019, which claims priority to U.S. Provisional Application 62/656,585, filed Apr. 12, 2018, the contents of which are incorporated herein in their entirety.

FIELD OF THE INVENTION

The invention relates generally to a system and method for implementing a multi-dealer market data distribution system.

BACKGROUND OF THE INVENTION

Large financial companies contribute a lot of information to information brokers to be distributed outside their firms. This information includes research reports, client statements, trade confirmations, responses to quotes, etc. The most actively moving and varied category is market data. Data in this category may include index valuations, indicative quotes, reference data for new securities, indications of interest, etc. Information changes at a variable pace per financial security and can move quickly.

In the age of information, financial institutions are concerned with entitlements controls, methods of consumption, cross-company content sharing, dangers of disclosure, etc. Over the course of the last decades, a small number of entrenched vendors have built data monopolies in specific asset classes and have limited incentives to innovate in the space. Because data is so sensitive, financial institutions are not willing to entrust others with the full range of their data.

These and other drawbacks exist.

SUMMARY OF THE INVENTION

According to one embodiment, the invention relates to a system that implements a multi-dealer market data distribution. A system comprises: an input that receives information from a plurality of member contributors; a secure communications platform that facilitates communication with the plurality of member contributors and readers; and a processing engine that comprises a processor programmed to perform the steps comprising: receiving, via the input, market data from a member contributor, the market data associated a set of entitlement controls; aggregating the market data from the plurality of member contributors; storing, via a repository, the raw and aggregated market data; applying the set of entitlement controls to the raw and aggregated market data; and providing each member syndication control of the market data contributed by each member contributor and preserving the set of entitlement controls specific to each member contributor.

The system may include a specially programmed computer system comprising one or more computer processors, interactive interfaces, electronic storage devices, and networks.

According to another embodiment, the invention relates to a method that implements a multi-dealer market data distribution. The method comprising the steps of: receiving, via an input, information from a plurality of member contributors wherein a secure communications platform facilitates communication with the plurality of member contributors and readers; receiving, via the input, market data from a member contributor, the market data associated a set of entitlement controls; aggregating the market data from the plurality of member contributors; storing, via a repository, the raw and aggregated market data; applying the set of entitlement controls to the raw and aggregated market data; and providing each member syndication control of the market data contributed by each member contributor and preserving the set of entitlement controls specific to each member contributor.

The computer implemented system, method and medium described herein provide unique advantages to entities, organizations and other users, according to various embodiments of the invention. The innovative system provides transparency to otherwise restricted pricing and other market data. The system provides access to a wider range of market data and provides a trusted engine to which sensitive data contributions may be made in a safe and secure manner. Moreover, for many users, the invention seeks to reduce spend on market data. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
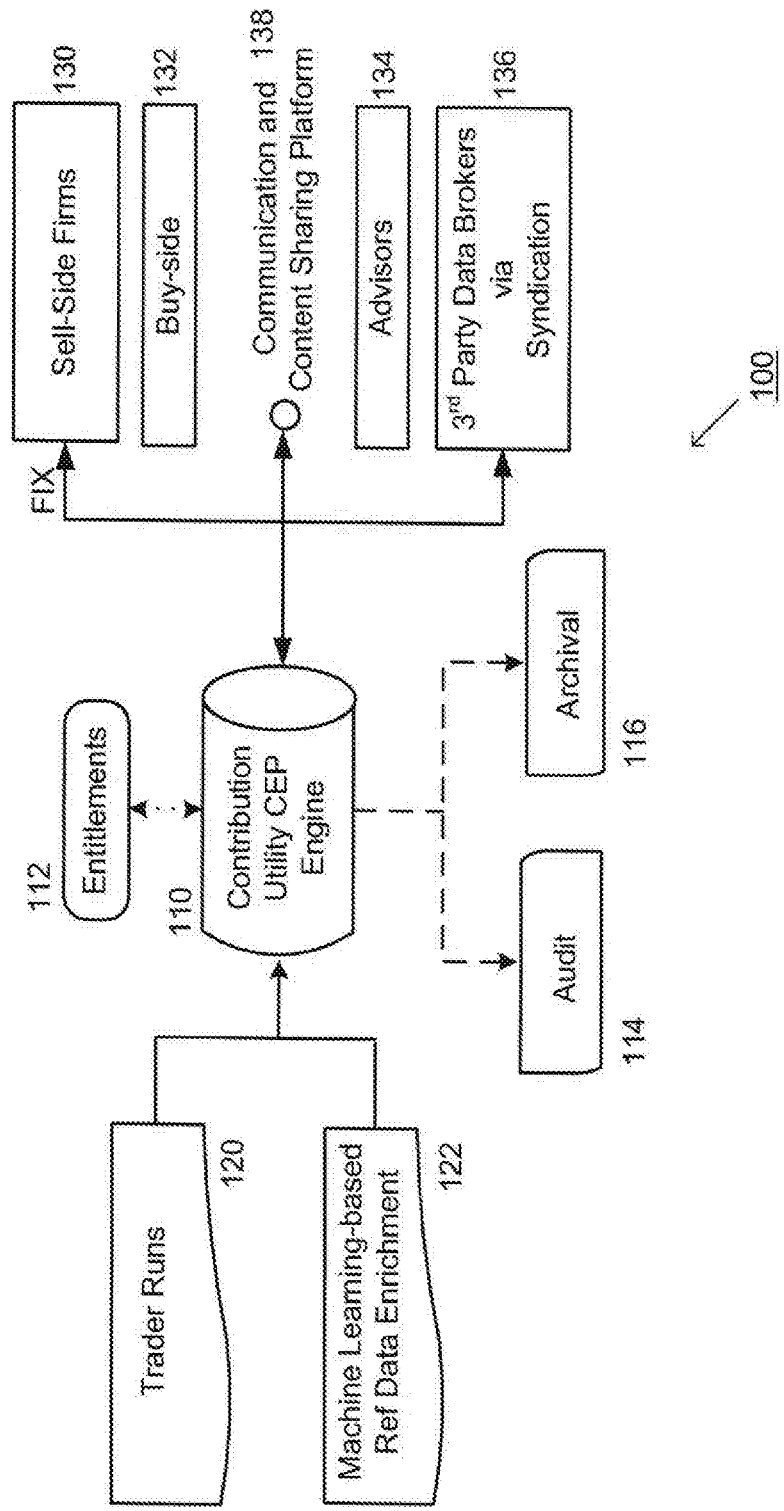
FIG. 1 is an exemplary system architecture, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to increasing the availability, quality and optionality of market data services (content and technology) used by industry practitioners to exchange data in order to optimize the performance of markets and ultimately benefit clients in terms of transparency, choice and cost. An embodiment of the present invention may provide a platform that accepts prices from individual contributing parties. These prices may be combined into an anonymized consensus price after automated checks and published at predetermined times. Suspect pricing may be flagged and queried, allowing contributors a chance to change erroneous pricing or withdraw based on rules and conditions. Results may be published through an access controlled interface or API. The platform may be used by various industry participants. A participant may include an information consumer (e.g., reader), producer and may also include both consumer and producer. For example, participants may include wealth management advisors who may not publish anything. Other types of participants may be supported by the various embodiments of the present invention. The embodiment may also apply to other classes of information and not be limited to market data. Examples of such data may include research reports, analyst rankings, reference data about securities, bid solicitations for municipal bonds, etc.

The features of the embodiments of the present invention provide benefits and advantages to the industry not fully available with current systems. An embodiment of the present invention seeks to mitigate the growing costs of market data (e.g., sourcing, processing, technology) borne by the industry and its customers, by encouraging the creation of contribution and consumption networks for data origination in a manner that promotes efficiency and competition, amongst industry participants. An embodiment of the present invention further enhances standardization amongst industry participants in relation to regulatory compliance through the creation of best-practice approaches and standards, and the utilization of data standards and appropriate data technology to drive down costs of compliance borne by the industry and customers. The system advocates for regulation around transparent and fair pricing of content services in areas where some elements of current practice may discourage competition, reduce choice and drive switching costs higher for industry participants and customers. The system may further support data product technology that promotes the creation of broader and improved financial data products, provides alternatives to choice-limiting bundled content/technology offers, and promotes the use of open APIs as a driver of improved market dynamics. The various features further ensure that members' data may be used to promote open and healthy competition in value-add data services to the industry.

An embodiment of the present invention is directed to a trusted information broker for various members' contributed data. This may include a joint venture, which may include a deputized corporate entity. This entity may bring to the project a list of best of breed solutions and subcontractors. The entity may receive, store and/or aggregate the information thereby providing members a range of syndication controls of the information received. Members and customers may have access to a high-speed API-driven method of controlling, contributing and accessing information. The system may also support other ways to retrieve and/or contribute information by human or computer-based players via industry-standard tools, such as a secure cloud based communication and content sharing program as well as other secure communications platforms.

According to an embodiment of the present invention, the system may implement a processing engine, such as a Complex Event Processing (CEP) engine, that treats contributed content as data, and allows for custom analytics, alerting, reporting, machine learning interfaces, etc., while preserving entitlements controls specific to participants.

With custom analytics, participants may agree to, with or without seeing each other's contributed data, to process contributed information that matches specific parameters through a predefined function. The output may become an independent instrument in the Market Data Hub, which may be governed by a set of commercial rules. Such rules may include free dissemination to the contributors and/or access to the information may be sold to customers. Other variations may be implemented.

An embodiment of the present invention may support various types of alerts. For example, alerts may refer to customers defining a set of instruments to monitor and conditions that would trigger particular actions, such as pop-up notifications, emails, automated data or trading actions, etc. The system may automatically apply these rules to monitored instruments and deliver alerts to customers that requested them.

Reporting may be used by contributing parties as well as other users. Reporting may include statistics of what and how much data was contributed, who has viewed it, any fees due to be collected, etc. Other metrics may be reported and analyzed.

Machine learning interfaces may look at wide data swaths at a time and process data quickly. Such interfaces, when approved though entitlements, may enable machine learning algorithms to find new patterns in the information and/or correlations, and generate alerts and/or custom analytics. Machine learning algorithms may learn from the information it sees over time rather than applying a deterministic formula to the current dataset. Here, the output may become an independent instrument in the Market Data Hub and may be governed by a set of rules, including commercial rules. The rules may include free dissemination to the contributors and/or access to the information may be sold to customers. Other variations may be implemented.

The system of an embodiment of the present invention may further support innovative technologies that may plug into existing members' processes, or be set up as new interfaces. For example, when a financial institution creates new bonds, an embodiment of the present invention may generate a complex terms sheet that defines conditions of the new bond. The complex terms sheet may then be communicated to a number of venues, where it may be analyzed to extract details relevant to their operations. Some entities may employ a site, where such manual parsing may be performed. The Market Data Hub of an embodiment of the present invention may leverage Machine Learning systems to parse documents initially communicated (e.g., via email, chat, portal, etc.) from various systems.

Non-incumbent data brokers presently lack data sets that are necessary to compete with various monopolistic incumbents, setting up a chain of events that reduce choice for both buy and sell side when picking technology and content platforms. Without the need to innovate, incumbents present barriers to the industry members when it comes to bringing in innovative technologies. Some players may even re-package data sent to it by an entity and then sell it back to the entity with limited or no value add. An embodiment of the present invention addresses many of the governance concerns while allowing new interfaces, methods, products, and communication solutions to come to the part of Finance industry that has seen limited change in the past decades.

By moving the data operations engine from traditional databases to a complex event processor, content is allowed to be freed up for flow. This leads to an ability to innovate on the content within the restrictions imposed by the entitlement system only. Such content may span multiple participants of various sizes. A low-frequency interface for consumption and contributions via a secure communications platform may allow smaller and less technically sophisticated industry players to be full participants in the benefits of this offering. Content syndication embedded into the Market Data Hub may allow members to control how their information is disseminated to various content brokers while maintaining protection over proprietary data they give up today when information leaves their firewalls.

An embodiment of the present invention recognizes that there is a monetization opportunity by selling products on top of the base data that is contributed, which is not currently available.

Implementation of the Market Data Hub may create an incentive to deploy a secure communications platform on buy-side desktops. Other features may include democratization of electronic trading in asset classes that are mostly high touch by relying on Smart Contracts technology that is central to Blockchain. The Market Data Hub may also be implemented by Distributed Ledger Technology, as described in U.S. Provisional Application No. 62/833,019, filed Apr. 12, 2019, the contents of which are incorporated herein in its entirety.

FIG. 1 is an exemplary system architecture, according to an embodiment of the present invention. FIG. 1 illustrates a combined feed of contributed prices from multiple dealers. The system provides a shared data store with multiple interfaces including a high frequency API-driven channel, a low volume distributed framework-based contribution and query interface, email (and other communications) submission of bulk updates. The system also provides reference data enrichment through parsing of terms sheets.

As shown in FIG. 1, System 100 may include an Engine 110, such as a Contribution Utility CEP (Complex Event Processing) Engine. Engine 110 may apply Entitlements, represented by 112, and further provide Audit and Archival functions, at 114 and 116, respectively. Entitlements represent strong content entitlements and controls. Inputs may include Trader Runs 120 and Machine Learning Reference Data Enrichment 122 in addition to other contributions. Engine 110 may communicate, either directly or indirectly, with Sell Side Firms 130, Buy Side Entities 132, Advisors 134 and Third party Data Brokers via Syndication 136. Interaction may be facilitated by a Communication and Content Sharing Platform represented by 138 or performed through a high speed API, such as FIX (Financial Information eXchange) protocol.

With an embodiment of the present invention, active market participants may contribute pricing information and further make the data available to the wider community. An embodiment of the present invention recognizes that bond pricing is extremely sensitive and an entity would generally not trust a competing entity with any related data. For example, an entity may contribute pricing data to the Engine and then view or otherwise access the contributed data. However, details to other pricing data contributed by other entities may be restricted and/or obscured. This may be implemented through fine-grained Entitlements. For example, some data may be shared with a specific user but not with another user who performs competitor-type functions, even if they are members of the same customer group. Also, data relating to some products and data points may be shared but not others. An entity may have index products relevant to a particular trader and a particular customer where information sharing is authorized. However, others within the same customer group may not be allowed to view the data due to the sensitive nature of the trade. Other restrictions and permissions may be applied.

Entitlements may also include business level decisions regarding the information, level of encryption as well as other features.

The system may also provide an audit function that audits information coming in and going out as well as the decisions made by the engine. This information may be useful for investigations as well as potential regulatory requests. The system may also benchmark performance of various instruments and maintain other metrics and events. An embodiment of the present invention may further maintain robust audit logging of access to and aggregation of raw and aggregated market data.

As shown in FIG. 1, inputs may include Trader Runs 120 and Machine Learning Reference Data Enrichment 122. Trader Runs 120 may represent email communications, chat logs, voice to text data and/or other electronic communications. Other inputs may be received, e.g., system driven contribution data and/or other offerings. For example, email communications may be received and then automatically scrapped for useful and/or relevant information. Machine Learning may listen to and observe events happening internally as well as externally. For example, Machine Learning may analyze data, such as bond prospective documents, and learn relevant data points to generate reference data.

Figure 2:
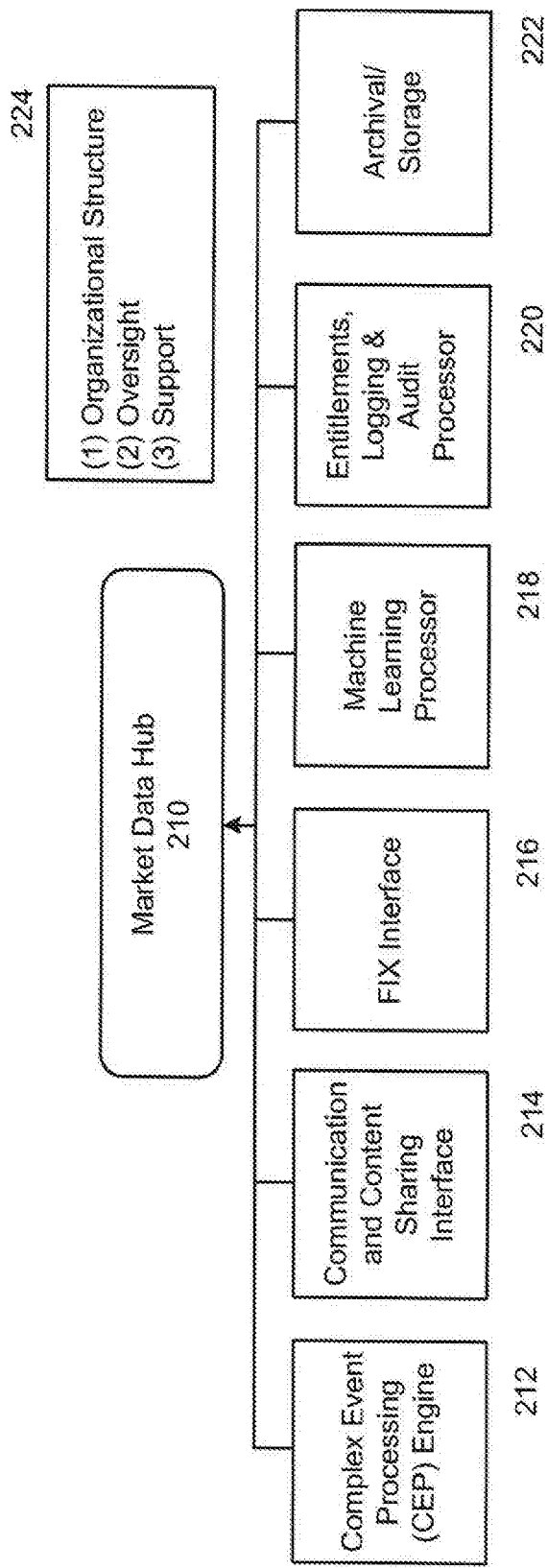
FIG. 2 is an exemplary system architecture, according to an embodiment of the present invention.

FIG. 2 is an exemplary system architecture, according to an embodiment of the present invention. Market Data Hub 210 may represent a single third party provider or a conglomerate of firms, such as financial institutions. As shown in FIG. 2, Market Data Hub 210 may be integrated with a Complex Engine Processing Engine 212, Communication and Content Sharing Interface 214, Financial Information eXchange (FIX) Interface 216, Machine Learning Processor 218, Entitlements, Logging and Audit Processor 220 and Archival/Storage 222. Market Data Hub 210 may represent an entity that provides organization structure, oversight and support, as represented by 224. FIX protocol may represent a standard communication method used between parties in a financial transaction that needs to be exchanged electronically. Other protocols may be used to satisfy specific requirements of member firms, or if new standards develop in the future.

An embodiment of the present invention is directed to maintaining a repository of market data from financial institutions and/or other sources of information. A user may submit a request to view/access currently known prices for a particular bond from a plurality of brokers. Another feature may involve creating a new data point for a particular bond that is also traded by other brokers. The system may then aggregate the information and generate an index of that data. The index may be generated in response to updated information.

An embodiment of the present invention may generate a data feed to various providers with varying degrees of aggregated information. Information may be streamed to various participants without concern that the information is being distributed to unauthorized recipients. An embodiment of the present invention may generate and share a combined index that spans multiple broker dealers and therefore not impact any single dealer's ability to trade. Feed recipients may subscribe to any security known by the Market Data Hub and, if entitled, would receive a data feed of streaming updates. If entitled, information may also be requested from Market Data Hub on one-off basis, a process known as "snapping," or historical data may be accessed in bulk, or via a visualization, such as a chart or a table. Other access modes may be supported.

Figure 3:
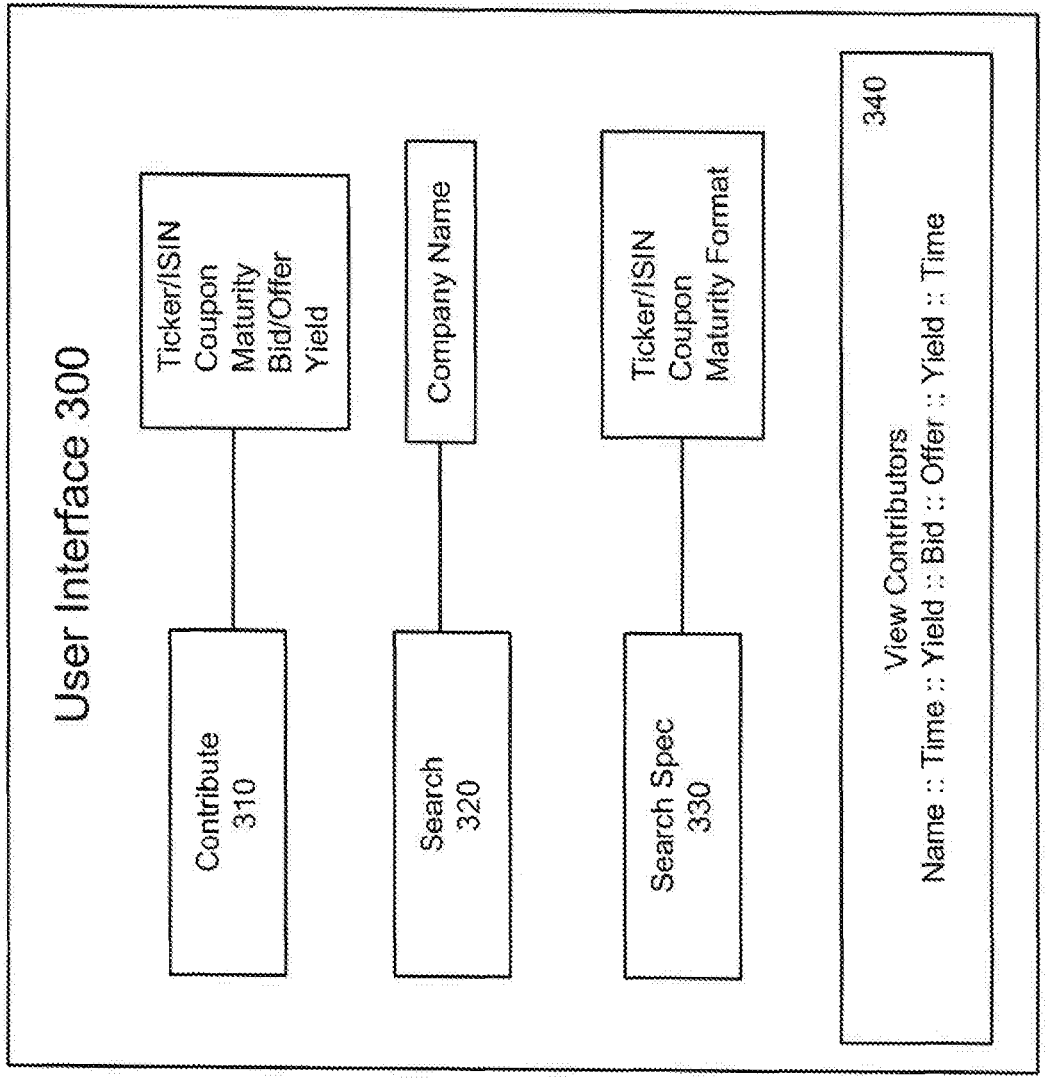
FIG. 3 is an exemplary user interface, according to an embodiment of the present invention.

FIG. 3 is an exemplary user interface, according to an embodiment of the present invention. User Interface 300 may provide user actions including Contribute 310, Search 320 and Search Spec 330. Contribute 310 enables a user to provide information including Ticker/ISIN, Coupon, Maturity, Bid/Offer and Yield. For example, a user may contribute information in the format; CBS, 2.3; 19; 78/67; 2.18/2.08. FIG. 3 is an exemplary illustration of an user interface specific to bonds where bonds are one example; other market data and instruments may be supported. Other formats may be supported.

Search 320 enables a user to search using a company name. The system may then provide rate and maturity for the company. A user may search using other metrics and the system may provide various other formats of information.

Search Spec 330 enables a user to search in Ticker/ISIN, coupon and maturity format. Other information may also be provided.

View Contributors 340 may provide a listing of contributors and contributed information. The format may include contributor name; time; yield; bid; offer; yield and time. Various other formats may be implemented.

Figure 4:
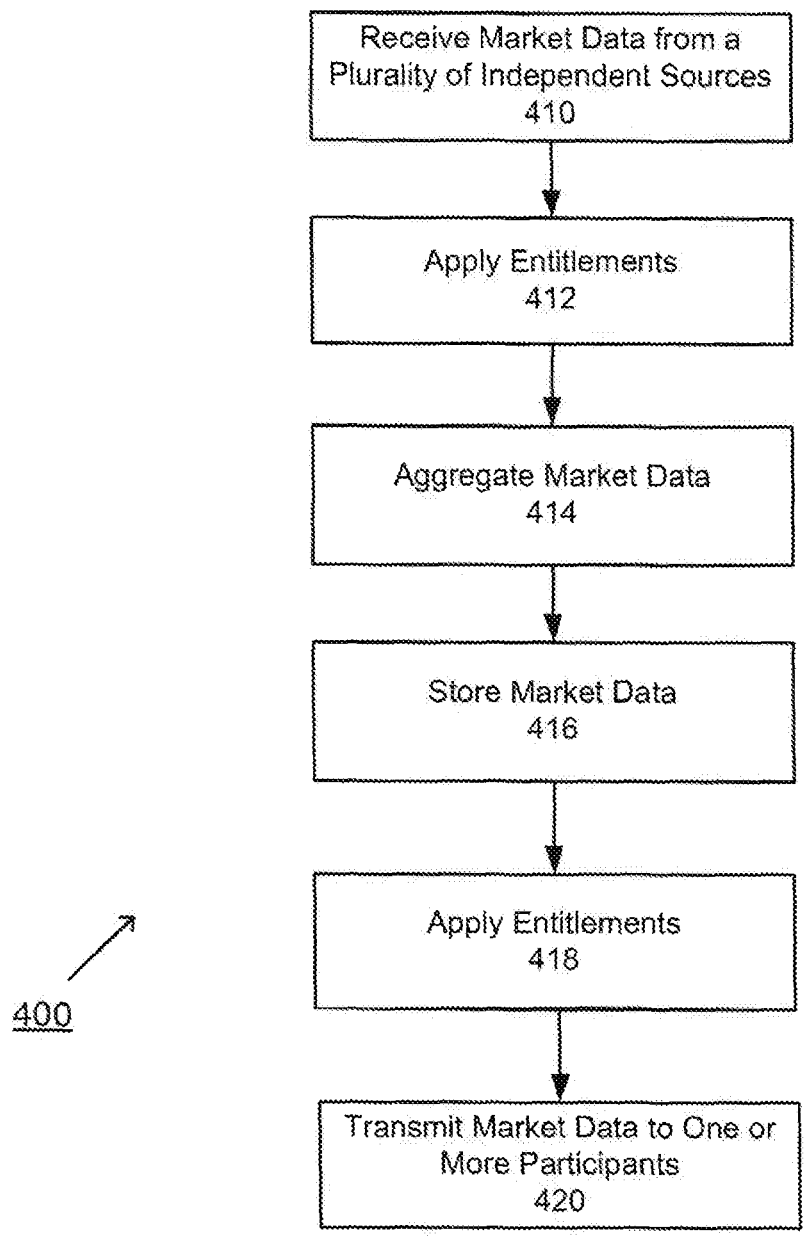
FIG. 4 is an exemplary flowchart of implementing a Market Data Hub, according to an embodiment of the present invention.

FIG. 4 is an exemplary flowchart of implementing a Market Data Hub, according to an embodiment of the present invention. At step 410, market data may be received from a plurality of independent sources, including financial institutions. At step 412, entitlements may be applied to preserve controls and protect sensitive data that may be specific to a contributing source. At step 414, market data may be aggregated. At step 416, the market data may be stored for archival and/or audit purposes. At step 418, an additional step of applying entitlements may be performed. Entitlements may be applied before transmitting the data to one or more participants. At step 420, the aggregated data may be made available to one or more participants in accordance with the entitlements. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

The Market Data Hub described herein may receive data from Consolidated Contributions Data Bridge, as described in the international patent application No. PCT/US19/27246, filed Apr. 12, 2019 and/or may be integrated with Global Contribution Analytics Tool, as described in the international patent application No. PCT/US19/40488, filed Jul. 3, 2019, the contents of which are incorporated by reference herein in their entirety. For example, Consolidated Contributions Data Bridge may send contributions data to various destinations, including Market Data Hub. Global Contribution Analytics Tool may analyze contributions data and further create visibility and analytics. The Market Data Hub may also be implemented by Distributed Ledger Technology, as described in U.S. Provisional Application No. 62/833,019, filed Apr. 12, 2019, the contents of which are incorporated herein in its entirety.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a multi-dealer market data distribution, the system comprising:
    an input that receives information from a plurality of member contributors;
    a secure communications platform that facilitates communication with the plurality of member contributors and readers; and
    a processing engine that comprises a processor programmed to perform the steps comprising:
    receiving, via the input, market data from each of the plurality of member contributors, the market data associated with a set of entitlement controls, wherein the set of entitlement controls:
        identifies at least one member contributor among the plurality of plurality of member contributors that is prohibited from accessing the respective market data,
        identifies at least one member contributor among the plurality of member contributors that is allowed sharing of the respective market data, and
        specifying a level of encryption for the respective market data;
    aggregating the market data received from each of the plurality of member contributors;
    storing, via a repository, the aggregated market data;
    applying the set of entitlement controls to the aggregated market data; and
    providing each member syndication control of the market data contributed by each member contributor and preserving the set of entitlement controls specific to each member contributor, such that at least two member contributors are allowed access to different portions of the aggregated market data according to the set entitlement controls.

2. The system of claim 1, wherein the market data is disseminated to downstream consumers and syndicated entities that are entitled to view the market data.

3. The system of claim 1, wherein the set of entitlement controls allows a member contributor to control how the information is disseminated to one or more content brokers.

4. The system of claim 1, wherein the input comprises an API that enables the member contributors to control, contribute and access the market data.

5. The system of claim 1, wherein the market data from multiple contributing banks is combined into anonymized consensus price.

6. The system of claim 1, further comprising an interactive user interface configured to provide contribution data and contributor data.

7. The system of claim 1, wherein the secure communications platform is implemented by an independent third party.

8. The system of claim 1, wherein the market data is distributed using block chain technology.

9. The system of claim 1, wherein the processing engine is integrated with Contribution Analytics Tool.

10. The system of claim 1, wherein the market data is received from a Consolidated Contributions Data Bridge.

11. A method that implements a multi-dealer market data distribution, the method comprising the steps of:
    receiving, via an input, information from a plurality of member contributors wherein a secure communications platform facilitates communication with the plurality of member contributors and readers;
    receiving, via the input, market data from each of the plurality of member contributors, the market data associated with a set of entitlement controls, wherein the set of entitlement controls:
        identifies at least one member contributor among the plurality of plurality of member contributors that is prohibited from accessing the respective market data,
        identifies at least one member contributor among the plurality of member contributors that is allowed sharing of the respective market data, and
        specifies a level of encryption for the respective market data;
    aggregating the market data received from each of the plurality of member contributors;
    storing, via a repository, the aggregated market data;
    applying the set of entitlement controls to the aggregated market data; and
    providing each member syndication control of the market data contributed by each member contributor and preserving the set of entitlement controls specific to each member contributor, such that at least two member contributors are allowed access to different portions of the aggregated market data according to the set entitlement controls.

12. The method of claim 11, wherein the market data is disseminated to downstream consumers and syndicated entities that are entitled to view the market data.

13. The method of claim 11, wherein the set of entitlement controls allows a member contributor to control how the information is disseminated to one or more content brokers.

14. The method of claim 11, wherein the input comprises an API that enables the member contributors to control, contribute and access the market data.

15. The method of claim 11, wherein the market data from multiple contributing banks is combined into anonymized consensus price.

16. The method of claim 11, further comprising an interactive user interface configured to provide contribution data and contributor data.

17. The method of claim 11, wherein the secure communications platform is implemented by an independent third party.

18. The method of claim 11, wherein the market data is distributed using block chain technology.

19. The method of claim 11, wherein the processing engine is integrated with Contribution Analytics Tool.

20. The method of claim 11, wherein the market data is received from a Consolidated Contributions Data Bridge.

* * * * *